United States Patent
Acharya et al.

(10) Patent No.: US 9,306,765 B2
(45) Date of Patent: Apr. 5, 2016

(54) ACCESS NODE BASED TARGETED INFORMATION INSERTION

(75) Inventors: Swarup Acharya, New Providence, NJ (US); Anurag Srivastava, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1646 days.

(21) Appl. No.: 12/389,903

(22) Filed: Feb. 20, 2009

(65) Prior Publication Data
US 2010/0217885 A1   Aug. 26, 2010

(51) Int. Cl.
| | |
|---|---|
| G06F 15/16 | (2006.01) |
| H04L 12/28 | (2006.01) |
| H04L 12/18 | (2006.01) |
| H04N 21/234 | (2011.01) |
| H04N 21/44 | (2011.01) |
| H04N 21/6543 | (2011.01) |
| H04N 21/81 | (2011.01) |
| H04N 21/858 | (2011.01) |

(52) U.S. Cl.
CPC .......... *H04L 12/2878* (2013.01); *H04L 12/185* (2013.01); *H04L 12/2881* (2013.01); *H04N 21/23424* (2013.01); *H04N 21/44016* (2013.01); *H04N 21/6543* (2013.01); *H04N 21/812* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 6,633,765 B1 * | 10/2003 | Maggenti | 370/312 |
| 7,203,758 B2 | 4/2007 | Cook et al. | |
| 7,228,356 B2 * | 6/2007 | Nguyen et al. | 709/231 |
| 7,986,702 B1 * | 7/2011 | Reister | 725/34 |
| 2002/0087976 A1 * | 7/2002 | Kaplan et al. | 725/34 |
| 2004/0210944 A1 | 10/2004 | Brassil et al. | |
| 2005/0081244 A1 | 4/2005 | Barrett et al. | |
| 2006/0239195 A1 | 10/2006 | Camins et al. | |

(Continued)

FOREIGN PATENT DOCUMENTS

WO   WO0247384   6/2002

OTHER PUBLICATIONS

B. Ver Steeg et al., "Unicast-Based Rapid Synchronization with RTP Multicast Sessions," AVT, Internet-Draft, Rapid Synchronization for RTP Flows, Jul. 2008, pp. 1-28.

(Continued)

*Primary Examiner* — Thomas Dailey
*Assistant Examiner* — Nam Tran
(74) *Attorney, Agent, or Firm* — Ryan, Mason & Lewis, LLP

(57) ABSTRACT

Advertisements or other types of targeted information are delivered to set-top boxes or other user interface devices of a signal distribution system. In one aspect of the invention, an access node sends a message to the user interface device directing the user interface device to switch from a content stream to a targeted information stream at a specified time. Responsive to the message, the access node receives a request from the user interface device to join a targeted multicast group associated with the targeted information stream. Without requiring receipt of a subsequent request from the user interface device to leave a content multicast group associated with a content stream, the access node causes the user interface device to be dropped from the content multicast group prior to the specified time. The access node then delivers the targeted information stream to the user interface device via the targeted multicast group.

19 Claims, 4 Drawing Sheets

(56) References Cited

U.S. PATENT DOCUMENTS

| | | |
|---|---|---|
| 2006/0259927 A1 | 11/2006 | Acharya et al. |
| 2006/0277576 A1 | 12/2006 | Acharya et al. |
| 2006/0287912 A1* | 12/2006 | Raghuvamshi ................. 705/14 |
| 2007/0107011 A1 | 5/2007 | Li et al. |
| 2007/0118617 A1 | 5/2007 | Lee et al. |
| 2007/0237330 A1 | 10/2007 | Srivastava |
| 2007/0240192 A1 | 10/2007 | Acharya et al. |
| 2007/0300252 A1 | 12/2007 | Acharya et al. |
| 2008/0005770 A1 | 1/2008 | Acharya et al. |
| 2008/0313669 A1 | 12/2008 | Acharya et al. |
| 2009/0307732 A1* | 12/2009 | Cohen et al. ................. 725/87 |

OTHER PUBLICATIONS

U.S. Appl. No. 12/241,400 filed in the name of S. Acharya et al. on Sep. 30, 2008 and entitled "Interface Device Having Multiple Software Clients to Facilitate Display of Targeted Information."

U.S. Appl. No. 12/197,505 filed in the name of S. Acharya et al. on Aug. 25, 2008 and entitled "Update Process for Interface Device Based Targeted Information Insertion."

U.S. Appl. No. 12/261,175 filed in the name of R. Haimi-Cohen on Oct. 30, 2008 and entitled "Fast Channel Change Request Processing."

* cited by examiner

US 9,306,765 B2

ACCESS NODE BASED TARGETED INFORMATION INSERTION

FIELD OF THE INVENTION

The present invention relates generally to signal distribution systems, and more particularly to techniques for providing targeted advertisements or other types of targeted information to user interface devices within such systems.

BACKGROUND OF THE INVENTION

Conventional signal distribution systems include, by way of example, cable television systems, satellite television systems, and systems providing Internet protocol television (IPTV) over digital subscriber line (DSL) or fiber. Such systems are configured to distribute media streams associated with subscription television services to system subscribers or other users. Typically, a given subscriber is provided with an interface device, such as a set-top box or receiver, for communicating with system head end equipment. The interface device is configured to permit the subscriber to receive, on a television or other presentation device coupled to the interface device at a given location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A number of techniques are known for providing targeted advertisements in a signal distribution system of the type described above. One example is described in PCT International Publication No. WO 02/47384, entitled "Method and Apparatus for IP Multicast Content Distribution System Having National and Regional Demographically Targeted Advertisement Insertion." In this technique, demographic targeting of inserted advertisement content is accomplished on a per-stream basis at a regional network level by modifying header information during a packet replication process.

A problem with these and other known techniques is that the advertisement insertion process is typically carried out entirely in head end equipment of the system, so as to be fully transparent to the interface device. Thus, the interface device at the user location is not even aware that the targeted insertion is taking place, and cannot distinguish between a stream having inserted targeted advertisements and an ordinary stream. This type of arrangement unduly limits the flexibility of the system, and may prevent it from achieving a desired level of granularity in its targeting of advertisements to particular groups of users. It also makes it difficult to adapt the insertion process to situations such as a user changing a channel while a targeted advertisement is being played.

These and other problems are addressed by techniques disclosed in U.S. patent application Ser. No. 11/764,472, filed Jun. 18, 2007 and entitled "Targeted Advertisement Insertion with Interface Device Assisted Switching," which is commonly assigned herewith and incorporated by reference herein. These techniques directly involve a set-top box or other interface device in the insertion process.

However, when the interface device is involved in the insertion process, it can be difficult to precisely coordinate the switching between a content stream and a targeted advertisement stream among multiple interface devices. This is due primarily to difficulties in synchronizing the multiple interface devices with a centralized advertisement server. Variable network delays and buffering characteristics associated with the different interface devices can lead to excessive latencies in switching between content streams and ad streams in the interface devices. Such latencies can result in display blanking or cause initial portions of targeted advertisements to be missed, and otherwise undermine system performance.

SUMMARY OF THE INVENTION

The present invention in one or more illustrative embodiments provides improved processes for targeted information insertion in an IPTV system or other type of signal distribution system.

In accordance with one aspect of the invention, advertisements or other types of targeted information are delivered to user interface devices of a signal distribution system. An access node of the system sends a message to a given user interface device directing the user interface device to switch from a content stream to a targeted information stream at a specified time. Responsive to the message, the access node receives a request from the user interface device to join a targeted multicast group associated with the targeted information stream. Without requiring receipt of a subsequent request from the user interface device to leave a content multicast group associated with a content stream, the access node causes the user interface device to be dropped from the content multicast group prior to the specified time. The access node then delivers the targeted information stream to the user interface device via the targeted multicast group, and the user interface device switches to the targeted information stream at the specified time.

In one of the illustrative embodiments, the access node comprises at least one line card or other type of service blade coupled to a DSL access multiplexer (DSLAM). The service blade sends the message to the user interface device directing the user interface device to switch from the content stream to the targeted information stream at the specified time, and directs the server to commence delivery of the targeted information stream to the access node. The service blade includes an internal buffer for storing the portion of the targeted information stream received from the server. The service blade causes the user interface device to be dropped from the content multicast group prior to the specified time by sending a message to the DSLAM directing the DSLAM to execute a forced leave request. After sending the message to the DSLAM, the service blade releases the stored portion of the targeted information stream to the DSLAM so as to permit the DSLAM to commence delivery of the targeted information stream via the targeted multicast group.

A given illustrative embodiment of the invention may be implemented without the need for local storage at the user interface device. However, other embodiments of the invention may provide one or more user interface devices with local storage capability.

The illustrative embodiments advantageously facilitate the provision of targeted advertisements and other targeted information in a wide variety of signal distribution systems. For example, more precise coordination of the switching from a content stream to a targeted advertisement can be achieved across multiple interface devices. This reduces latency in switching from the content stream to the targeted information stream in a given user interface device, thereby avoiding display blanking and ensuring that initial portions of targeted advertisements are not missed, even in the presence of significant differences in network delays and buffering characteristics between the interface devices.

DETAILED DESCRIPTION OF THE INVENTION

The invention will be described herein in conjunction with illustrative embodiments of signal distribution systems and associated targeted information insertion techniques. It should be understood, however, that the invention is not limited to use with the particular systems and techniques described, but is instead more generally applicable to any signal distribution system in which it is desirable to provide improved handling of targeted information insertion. For example, although described herein primarily in the context of IPTV systems, the techniques of the invention can also be adapted in a straightforward manner to other types of signal distribution systems, including, for example, cellular systems.

Figure 1:
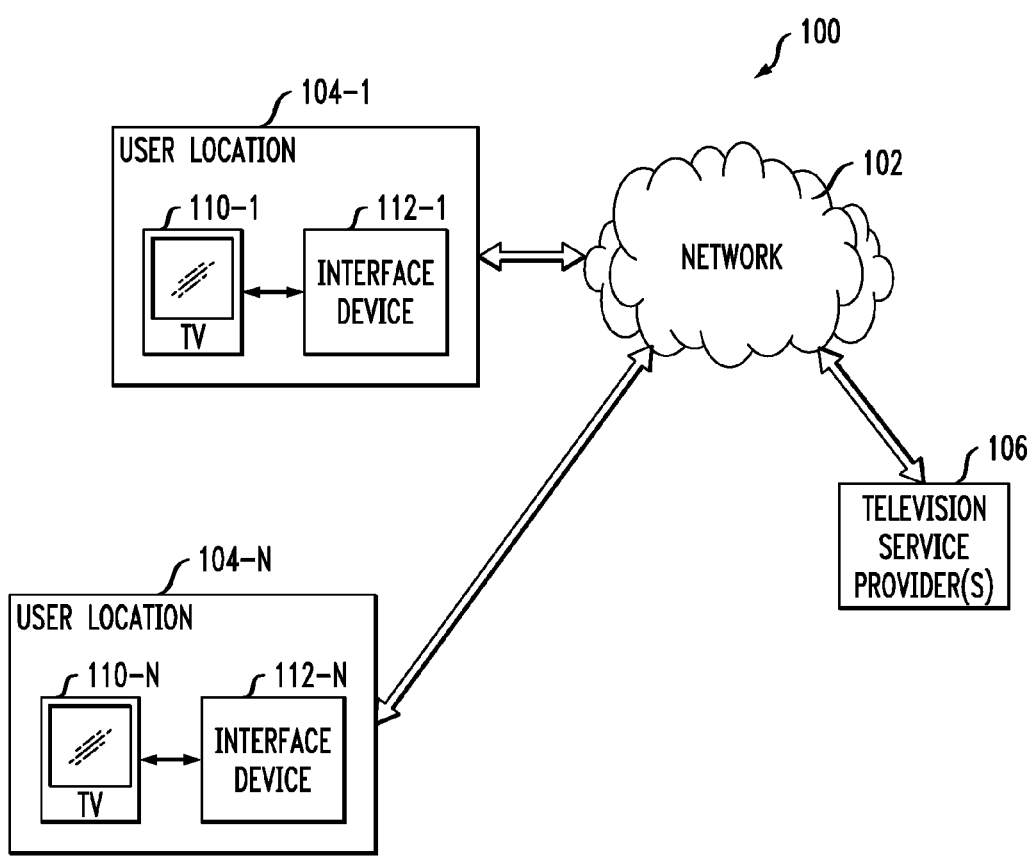
FIG. 1 shows an illustrative embodiment of a signal distribution system in accordance with the invention.

Referring now to FIG. 1, a signal distribution system 100 comprises a network 102 over which equipment at user locations 104-1 through 104-N communicates with one or more television service providers 106. The signal distribution system 100 may comprise, by way of example, an IPTV system. Element 106 may comprise otherwise conventional service provider equipment, including, for example, head end systems, satellites, servers, etc. The equipment at a given location 104-$i$, $i=1,\ldots N$, comprises a television 110-$i$ coupled to an interface device 112-$i$. The interface devices 112 for purposes of the illustrative embodiments will be assumed to be STBs, but in other embodiments may comprise, for example, receivers, computers, or other processor-based devices, in any combination. Such devices are also referred to herein as user interface devices. A given device of this type allows one or more users to access content streams that are delivered to the device via other elements of the signal distribution system.

The network 102 may comprise any type of communication network suitable for transporting signals associated with the provision of television services, and the invention is not limited in this regard. For example, portions of the network 102 may comprise local networks, wide area networks, the Internet, etc.

It is to be appreciated that the invention does not require any particular geographic relationship between the various user locations 104. For example, the locations may all be within the same local area, served by a single common DSLAM. It is also possible that the different locations may be served by different DSLAMs. Numerous alternative arrangements are possible, as will be apparent to those skilled in the art.

A given one of the interface devices 112 may comprise, for example, a processor coupled to a memory. The processor may be implemented as a microprocessor, a microcontroller, an application-specific integrated circuit (ASIC) or other type of processing device, as well as portions or combinations of such devices. The processor may comprise a decoder for converting received content streams to a format suitable for presentation on television 110. The memory may include an electronic random access memory (RAM), a read-only memory (ROM) or other type of storage device, as well as portions or combinations of such devices. A portion of the memory may comprise an input buffer for storing content streams received from the television service provider 106. The processor and memory are used in storage and execution of one or more software programs for implementing interface device portions of the targeted information insertion techniques disclosed herein. Such a memory may be viewed as an example of what is also referred to herein as a computer-readable storage medium.

The particular signal distribution system configuration shown and described in conjunction with FIG. 1 should be viewed as an illustrative example of such a system, and it is to be understood that the invention can be implemented using other types and configurations of system components.

The present invention in one or more illustrative embodiments deals with targeted information insertion in an IPTV system. Exemplary targeted information insertion techniques will now be described in greater detail with reference to FIGS. 2 through 4. Again, it will be assumed for description of certain of these illustrative embodiments that the interface device 112 is an STB, although other types of interface devices could be used.

Figure 2:
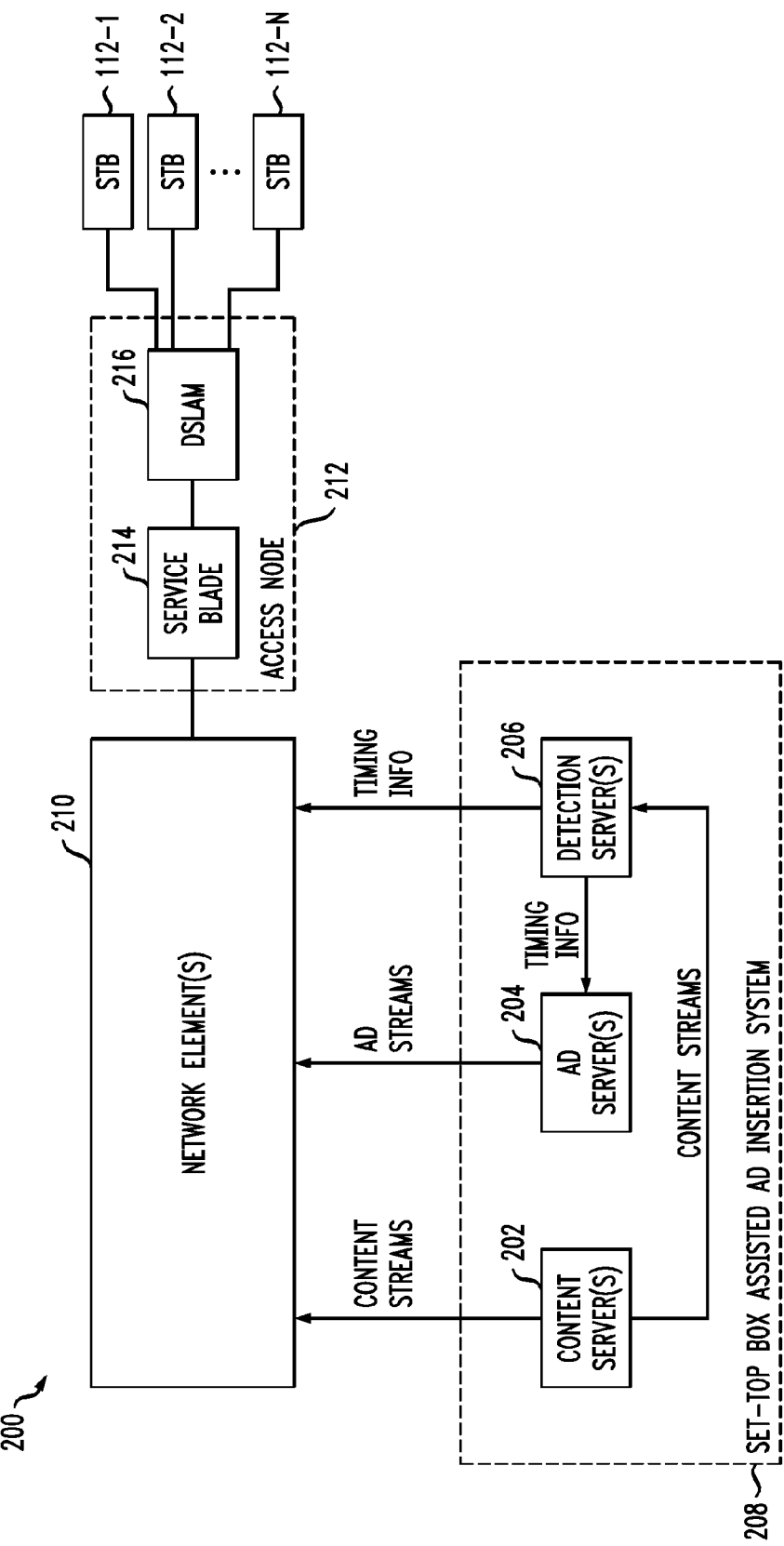
FIG. 2 is a more detailed view of a portion of the signal distribution system of FIG. 1.

FIG. 2 shows a more detailed view of one possible implementation of a portion of the system 100. In this embodiment, the network 102 comprises an IP network over which multiple streams are delivered to STB 112 via IPTV head end equipment associated with a television service provider 106. The advertisement insertion process in this embodiment and others described herein may be implemented at least in part in the form of software that is executed by system elements such as one or more interface devices and equipment of one or more television service providers. Again, although illustrated in the context of IPTV, the described services can be adapted in a straightforward manner for use in other types of signal distribution systems, such as cable and satellite television systems.

It is assumed in the FIG. 2 embodiment that targeted ad streams are not cached or otherwise locally available at the STB 112. Instead, such streams are delivered to the STB in substantially real time. The present embodiment therefore avoids the need to pre-push targeted advertisements to the STB for local storage. However, it is to be appreciated that embodiments of the present invention can be implemented using one or more STBs which have an associated local storage device or other local storage capability.

In the FIG. 2 arrangement, a portion 200 of system 100 comprises one or more content servers 202, one or more ad servers 204, and one or more detection servers 206. The servers are part of a set-top box assisted ad insertion system 208. These elements in the present embodiment are assumed to be associated with television service provider 106, but could alternatively be associated with other system elements. The servers 202, 204 and 206 may each comprise separate stand-alone servers, or two or more of them may be implemented on a common processing platform. For example, these servers may be implemented as servlets of a larger ad insertion system server.

The servers 202, 204 and 206 are coupled to one or more network elements 210 which may comprise network switches, routers, gateways or other elements, in any combination. For example, the one or more network elements 210 may comprise a Gigabit Ethernet switch or other video switch suitable for processing streams for transmission to the STBs 112.

Although in a given embodiment there may be multiple instances of each of the elements 202, 204, 206 and 210, single instances of such elements will be referred to below for simplicity and clarity of description. Also, there may be multiple instances of other system elements, although not expressly indicated in FIG. 2.

By way of example, an alternative embodiment may be configured to include a plurality of DSLAMs arranged in a hierarchical structure or other interconnected arrangement, rather than a single DSLAM as shown in FIG. 2. Such multiple DSLAMs may be arranged within a single access node or distributed across multiple access nodes.

In another alternative embodiment, one or more of the servers 202, 204 and 206 may instead be implemented in whole or in part internally to the network element 210, utilizing one or more line cards or other processing devices of that network element.

The network element 210 is coupled via an access node 212 to the STBs 112. The access node in this embodiment comprises a service blade 214 coupled to a DSLAM 216. The service blade may be implemented, for example, as at least one line card installed within the DSLAM, or as a separate stand-alone device coupled between the DSLAM and network element 210. As will be described in greater detail below, the service blade further comprises a memory implementing a stream buffer for storing ad streams delivered by the ad server 204.

The term "service blade" as used herein is intended to be construed broadly, so as to encompass, for example, one or more line cards.

A content stream generated by content server 202 is provided via network element 210 and access node 212 to one or more of the STBs 112. The content stream is also provided to detection server 206. The detection server processes the content stream to detect ad markers or other ad cues in that stream. The detection server utilizes the detected ad cues to generate timing information. For example, the detected cues may be utilized to provide timing information indicating the beginning and duration of a given ad slot in the content stream. The ad cues may comprise, by way of example, conventional SCTE-35 signaling messages inserted into packets of an MPEG stream.

In one embodiment, the detection server 206 parses program association table (PAT) and program map table (PMT) information in an MPEG header to obtain the program identifier (PID) of an elementary stream (ES) carrying the ad cues, and monitors the ES to locate packets containing the ad cues. When these packets are found, usually about 8-10 seconds before the corresponding ad slot, they are processed to obtain the precise timing information as described by a corresponding presentation time stamp (PTS).

The timing information determined by the detection server 206 from the detected ad cues is signaled to the ad server 204 and the access node 212. Alternative embodiments could be configured to detect ad cues in other system elements, such as within the service blade 214 or DSLAM 216 of the access node 212. An example of such an alternative arrangement will be described in conjunction with FIG. 4, in which the service blade detects ad insertion cues and signals the ad server to start the appropriate ad streams. The detection server could therefore be implemented in the service blade or another element of the access node. This type of arrangement would involve bidirectional communication between the access node and the ad server, although such communication is not expressly illustrated in FIG. 2.

The ad server 204 may therefore utilize the timing information provided by the detection server 206 or access node 212 to start one or more ad streams. The ad streams are started at the appropriate times as indicated by the timing information. These streams are delivered to the STBs 112 via the network element 210 and access node 212.

A number of different techniques may be used to start the ad streams. For example, the ad server 204 may start the ad streams at times indicated by the detection server 206 or access node 212. These ad streams are started at the precise times as communicated by the detection server or access node, and do not pass through the detection server.

As will be described below, a given STB 112 utilizes timing information provided to it by the access node 212 to join the appropriate ad streams at the appropriate times. The STB thus switches from a content stream to an ad stream at an appropriate time as determined based on the timing information. The timing information is also utilized to allow the STB to return from the ad stream to the content stream at the appropriate time. For example, as noted above, the timing information may include a specified duration of the targeted ad. The STB can thus start a timer when it switches to the ad stream, and then switch back to the original stream when the timer expires. The stream switching in the STB may also or alternatively make use of conventional signaling protocols, such as Internet group management protocol (IGMP). For example, such protocols may be used to allow the STB to join a multicast group that is to receive a particular ad stream.

Additional details regarding the operation of an ad insertion system of the type described above can be found in the above-cited U.S. patent application Ser. No. 11/764,472.

As indicated previously herein, when the STB is involved in the ad insertion process, it can be difficult to precisely coordinate the switching from a content stream to an ad stream among multiple STBs. This is attributable to significant differences in network delays and buffering characteristics between the STBs, which can cause some of the STBs to exhibit display blanking or to miss initial portions of targeted ads.

The illustrative embodiments address this problem by configuring the access node 212 to control the switching of the STBs 112 between content streams and ad streams, as will be described in greater detail below in conjunction with FIGS. 3 and 4.

Figure 3:
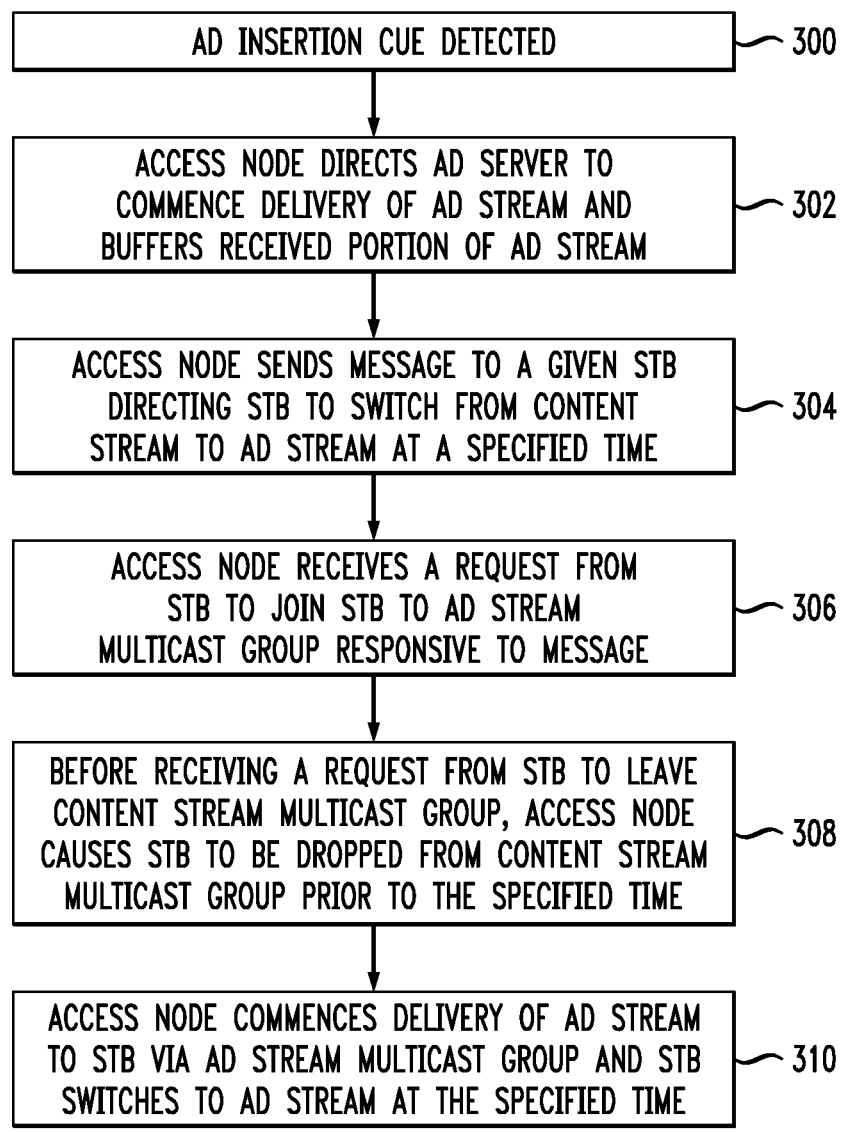
FIG. 3 is a flow diagram of a process for targeted information insertion implemented in the system as shown in FIGS. 1 and 2.

FIG. 3 shows steps 300 through 310 of an exemplary targeted advertisement insertion process implemented in the signal distribution system as illustrated in FIGS. 1 and 2. The process will be described as applied to a single one of the STBs 112, namely the first STB 112-1, but it is to be appreciated that similar techniques are used to control switching between content and ad streams in the other STBs.

In step 300, an ad insertion cue is detected in a given content stream. As indicated above, the insertion cue may be detected directly by the access node 212, or may be detected by detection server 206 and communicated to the access node. In the former type of arrangement, the detection server may be viewed as being implemented within an element of the access node, such as within service blade 214 or DSLAM 216, rather than within the ad insertion system 208 as shown in FIG. 2.

In step 302, the access node 212 sends a message to the ad server 204 directing the ad server to commence delivery of an ad stream to the access node. Again, this would require bidirectional communication between the access node and the ad server, although such communication is not expressly illustrated in FIG. 2. The access node buffers the ad stream as received from the ad server, for example, in an internal memory of the service blade 214 or DSLAM 216.

In step 304, the access node 212 sends a message to the given STB 112-1 directing the STB to switch from a content stream to the ad stream at a specified time.

In step 306, the access node 212 receives a request from the STB 112-1 to join an ad stream multicast group responsive to the message sent in step 304. This join request and other similar types of join or leave requests described herein may be implemented as IGMP join or leave requests. The join request received in step 306 may be executed immediately, such that the STB is joined to the appropriate ad stream multicast group. This does not create bandwidth concerns as the access node at this time is only buffering the ad stream rather than delivering it to the STB via the ad stream multicast group. Thus, the ad stream will not interfere with delivery of the content stream to the STB.

In step 308, before receiving a request from the STB 112-1 to leave its current content stream multicast group, the access node 212 causes the STB to be dropped from the content stream multicast group prior to the specified time referred to in step 304. This may be achieved, for example, by having the service blade 214 send an appropriate message to the DSLAM 216 directing the DSLAM to execute a forced leave request for the DSLAM port associated with the particular STB. The access node has knowledge of the precise timing information that indicates when the ad stream insertion should occur, and so can determine the appropriate time to drop the STB from the content stream multicast group.

In step 310, the access node 212 commences delivery of the ad stream to the STB 112-1 via the ad stream multicast group. The STB then switches to the ad stream at the specified time referred to in step 304.

The access node 212 may signal multiple STBs in step 304 to switch from a given content stream to a given ad stream at the specified time. In such an arrangement, it is desirable to configure the STBs such that they issue their respective join requests after random delays, so as to avoid flooding the DSLAM 216 with an excessive number of simultaneous join requests. This can be achieved by incorporating random delay elements in the respective STBs, such that each sends its join request only after the random delay.

The particular process steps shown in FIG. 3 are presented by way of illustrative example only, and other process steps may be used in other embodiments. Also, although the FIG. 3 process is described with reference to targeted advertisements, it is contemplated that the process could be applied to other types of targeted information, such as, for example, custom program guides, on-demand video screens, etc.

Figure 4:
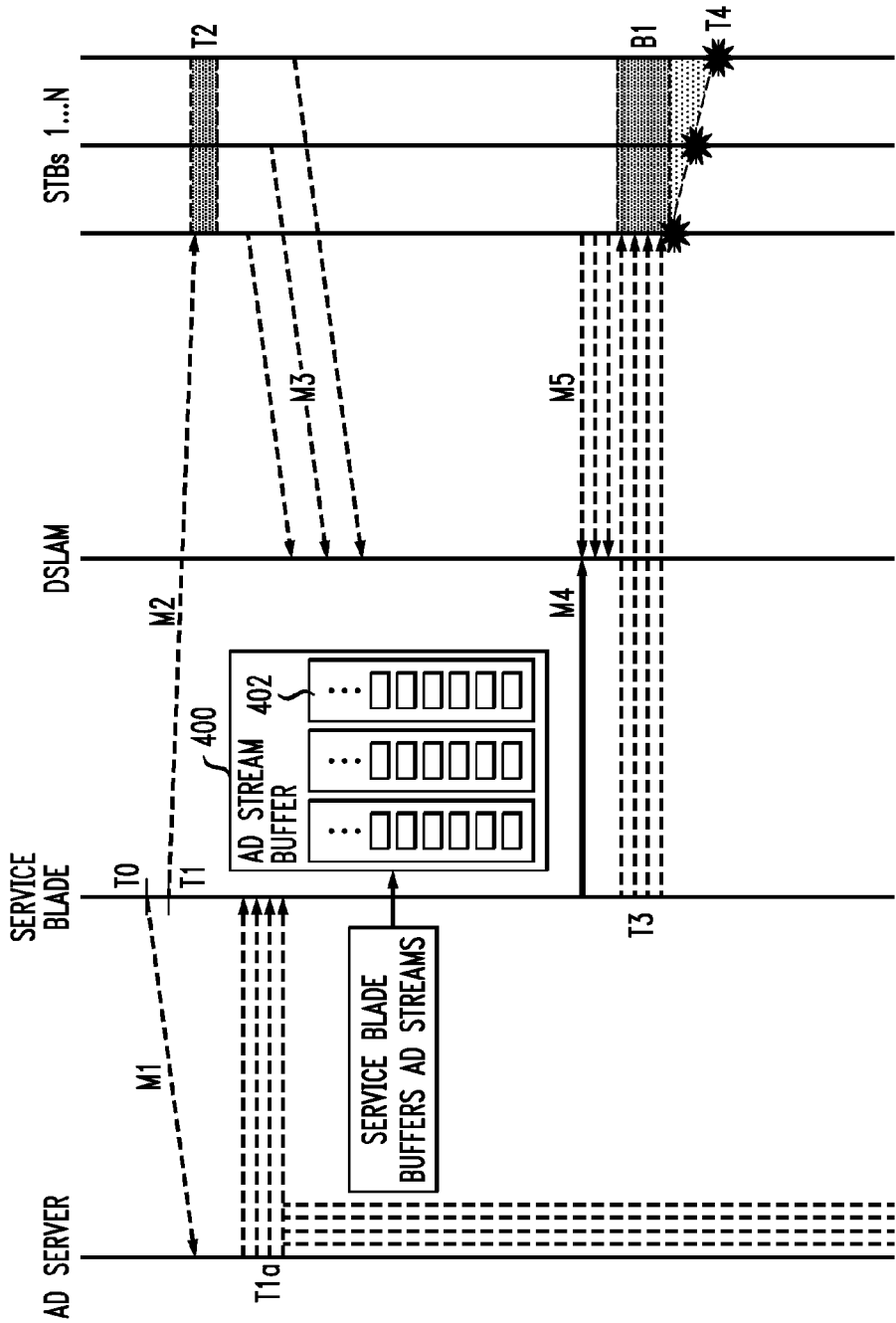
FIG. 4 illustrates message flows that occur between elements of the system of FIGS. 1 and 2 in an exemplary implementation of the insertion process of FIG. 3.

FIG. 4 shows an exemplary messaging sequence between ad server 204, service blade 214, DSLAM 216 and STBs 112 in an illustrative embodiment. The diagram shows times T0, T1, T1a, T2, T3 and T4, and messages M1, M2, M3, M4 and M5.

At time T0, the service blade 214 detects an ad cue for an advertisement that is to start at time T3. The service blade then sends a message M1 to instruct the ad server 204 to start sending the ad streams.

At time T1, the service blade 214 sends a message M2 to the STBs 112 instructing them to switch to the ad stream at time T4.

At time T1a, the ad server 204 starts sending the ad streams responsive to message M1 received from the service blade 214. The service blade buffers these streams in an internal ad stream buffer 400 which includes a separate storage queue 402 for each of the ad streams sent from the ad server. Each storage queue 402 may be configured to store approximately 1-2 seconds of ad stream packets.

At time T2, message M2 begins to be received in the STBs 112 from the service blade 214. Due to different network delays between the access node 212 and the STBs, the message M2 is not received in each STB at exactly the same time.

In response to receipt of message M2, each of the STBs sends a join request M3 to the DSLAM 216 in order to join the multicast group for the appropriate ad stream. Each STB sends its join request immediately upon receipt of the message M2. As noted above, the join requests M3 from the STBs 112 may be spaced apart randomly in order to avoid flooding the DSLAM. This random spacing can be achieved, for example, by generating a random delay in each STB and using the random delay to control release of the join request. The DSLAM joins each of the STBs to the multicast group of its appropriate ad stream. However, as the ad streams are not yet being sent via the multicast groups, there is no ad stream traffic transmitted from the DSLAM to the STBs even though the STBs have already joined the ad stream groups.

At time T3, the service blade 214 sends message M4 to the DSLAM 216 instructing the DSLAM to execute a forced leave request for the content stream multicast groups of the STBs 112 that are to receive the ad streams. This forced leave request is performed on a per-port basis for the STBs that are to receive the ad streams. The DSLAM thus does not wait to receive leave requests M5 from the individual STBs. Instead, as noted above, the DSLAM forces those STBs to leave the content stream multicast groups at substantially the same time responsive to message M4 received from the service blade. When the leave requests M5 arrive from the STBs, those requests can be ignored, as the STBs have already been forced to leave the content stream groups.

After sending the message M4, the service blade 214 releases the ad streams to the DSLAM 216 and those ad streams are transmitted in their respective multicast groups to the STBs 112. The period of time in which the ad streams are released is generally denoted B1 in the figure. Since the DSLAM forces a given STB to leave its content stream multicast group before the ad stream is released by the service blade, there is no danger of bandwidth overrun on the connection between the DSLAM and that STB.

The ad streams are received and played by the STBs 112 at times corresponding generally to time T4. As can be seen from the figure, the actual switching time T4 may not be exactly the same for each of the STBs. This is due to the varying network delays and buffering characteristics associated with the STBs. However, each STB will transition smoothly from its content stream to its ad stream by virtue of the timing control provided in the access node. The access node ensures that delivery of content stream packets is interrupted at the appropriate time and followed immediately by delivery of ad stream packets, allowing each STB to make a smooth transition between the content and ad streams.

This embodiment advantageously avoids display blanking and other switching latency problems that can arise due to differences in network delays and STB buffering characteristics. Each STB leaves its content stream multicast group and begins to receive ad stream packets from the appropriate ad stream multicast group at substantially the same time. The service blade and DSLAM control this switching in the manner indicated above based on their knowledge of the appropriate ad insertion points. The first ad stream packet is placed "on the wire" or otherwise made available to a given STB right after the last content stream packet prior to the ad insertion point has been sent. Thus, when the given STB performs the switch from content stream to ad stream after decoding the last content stream packet prior to the ad insertion point, it will find the first ad packet "on the wire" or otherwise readily available, thereby minimizing the switching latency and achieving near-seamless visual performance.

The access node 212 will generally include at least one processor coupled to at least one memory. Each of the service blade 214 and DSLAM 216 may include such processor and memory elements, configured in a well-known conventional manner. More particularly, an access node processor may comprise, for example, a microprocessor, a microcontroller, an ASIC or other type of processing device, as well as portions or combinations of such devices. An access node memory may comprise RAM, ROM or another type of storage device, as well as portions or combinations of such devices. Such a memory is an example of what is more generally referred to herein as a computer-readable storage medium. The access node processor and memory elements are used in storage and execution of one or more software programs for implementing access node portions of targeted advertisement insertion processes in the manner disclosed herein.

As mentioned previously, the illustrative embodiments provide more precise coordination of the switching from a content stream to a targeted ad stream across multiple STBs. This ensures that initial portions of targeted ads are not missed, even in the presence of significant differences in network delays and buffering characteristics between the STBs. In these embodiments, when an STB performs a switch from a content stream to an ad stream, it immediately finds ad stream packets available in its video buffer, and does not have to wait to fill that buffer with ad stream packets. This leads to significantly reduced latency in switching from a content stream to an ad stream.

The above-described embodiments of the invention are intended to be illustrative only. For example, as indicated previously, the techniques can be applied to a wide variety of signal distribution systems and media delivery services. Also, the media streams that are delivered to an interface device associated with a given user may include any type of data, including, for example, audio, video, speech or other information signals, in any combination. Furthermore, the particular configuration of the access node may be varied in other embodiments, and need not include separate service blade and DSLAM elements as in the illustrative embodiments of FIGS. 2 and 4. Alternative embodiments may therefore comprise an access node having only a DSLAM or other types or arrangements of conventional access node elements suitably modified to implement the ad insertion functionality described herein. These and numerous other alternative embodiments within the scope of the following claims will be readily apparent to those skilled in the art.

We claim:

1. A method of providing targeted information to a user interface device in a signal distribution system, the system comprising an access node that is coupled between the user interface device and a server, the method comprising the steps of:
    sending a message from the access node to the user interface device directing the user interface device to switch from a content stream to a targeted information stream at a specified time;
    storing at least a portion of the targeted information stream received from the server in the access node;
    receiving in the access node a request from the user interface device, responsive to the message from the access node, to join a targeted multicast group associated with the targeted information stream;
    without requiring receipt in the access node of a request from the user interface device to leave a content multicast group associated with a content stream, the access node causing the user interface device to be dropped from the content multicast group prior to the specified time; and
    delivering the targeted information stream from the access node to the user interface device via the targeted multicast group.

2. The method of claim 1 wherein the targeted information stream comprises a targeted advertisement.

3. The method of claim 1 wherein the access node receives a plurality of requests from respective ones of a plurality of user interface devices to join the targeted multicast group associated with the targeted information stream responsive to respective messages sent from the access node to those user interface devices.

4. The method of claim 1 wherein responsive to detection of an insertion cue, the access node sends a message to the server directing the server to commence delivery of the targeted information stream to the access node.

5. The method of claim 4 wherein the insertion cue is detected in the access node.

6. The method of claim 1 wherein the access node causes the user interface device to be dropped from the content multicast group by executing a forced leave request.

7. The method of claim 6 wherein the forced leave request is executed on a per-port basis.

8. The method of claim 1 wherein the access node comprises a service blade coupled to a DSLAM, and further wherein the storing step comprises storing the portion of the targeted information stream in a stream buffer of the service blade.

9. The method of claim 8 wherein the service blade causes the user interface device to be dropped from the content multicast group prior to the specified time by sending a message to the DSLAM directing the DSLAM to execute a forced leave request.

10. The method of claim 9 wherein after sending the message to the DSLAM, the service blade releases the stored portion of the targeted information stream to the DSLAM so as to permit the DSLAM to commence delivery of the targeted information stream via the targeted multicast group.

11. The method of claim 1 wherein delivery of the targeted information stream from the access node to the user interface device via the targeted multicast group is commenced only after the user interface device has been dropped from the content multicast group.

12. A non-transitory computer-readable storage medium having embodied therein executable program code that when executed in an access node of a signal distribution system controls the access node to perform the steps of:
    sending a message to a user interface device directing the user interface device to switch from a content stream to a targeted information stream at a specified time;
    storing at least a portion of the targeted information stream;
    receiving a request from the user interface device, responsive to the message, to join a targeted multicast group associated with the targeted information stream;
    without requiring receipt of a request from the user interface device to leave a content multicast group associated with a content stream, causing the user interface device to be dropped from the content multicast group prior to the specified time; and
    delivering the targeted information stream to the user interface device via the targeted multicast group.

13. An apparatus for providing targeted information to a user interface device in a signal distribution system, the apparatus comprising:
    an access node coupled between the user interface device and a server of the system;

the access node comprising a memory for storing at least a portion of a targeted information stream received from the server;

wherein the access node is configured to send a message to the user interface device directing the user interface device to switch from a content stream to the targeted information stream at a specified time, and to receive responsive to the message a request from the user interface device to join a targeted multicast group associated with the targeted information stream;

wherein the access node is further configured to cause the user interface device to be dropped from a content multicast group associated with the content stream prior to the specified time and without requiring receipt of a request from the user interface device to leave the content multicast group; and wherein the access node is further configured to deliver the targeted information stream to the user interface device via the targeted multicast group.

14. The apparatus of claim 13 wherein delivery of the targeted information stream from the access node to the user interface device via the targeted multicast group is commenced only after the user interface device has been dropped from the content multicast group.

15. The apparatus of claim 13 wherein the access node further comprises:
   a service blade; and
   a DSLAM coupled to the service blade.

16. The apparatus of claim 15 wherein the service blade comprises at least one line card installed within the DSLAM.

17. The apparatus of claim 15 wherein the memory comprises a stream buffer of the service blade.

18. The apparatus of claim 15 wherein the service blade is operative to cause the user interface device to be dropped from the content multicast group prior to the specified time by sending a message to the DSLAM directing the DSLAM to execute a forced leave request.

19. The apparatus of claim 18 wherein after sending the message to the DSLAM, the service blade releases the stored portion of the targeted information stream to the DSLAM so as to permit the DSLAM to commence delivery of the targeted information stream via the targeted multicast group.

* * * * *